(12) United States Patent
Okabe et al.

(10) Patent No.: US 9,875,236 B2
(45) Date of Patent: Jan. 23, 2018

(54) ANALYSIS OBJECT DETERMINATION DEVICE AND ANALYSIS OBJECT DETERMINATION METHOD

(71) Applicant: NEC Corporation, Minato-ku, Tokyo (JP)

(72) Inventors: Koji Okabe, Tokyo (JP); Yoshifumi Onishi, Tokyo (JP); Makoto Terao, Tokyo (JP); Masahiro Tani, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/909,187

(22) PCT Filed: Mar. 27, 2014

(86) PCT No.: PCT/JP2014/058758
§ 371 (c)(1),
(2) Date: Feb. 1, 2016

(87) PCT Pub. No.: WO2015/019662
PCT Pub. Date: Feb. 12, 2015

(65) Prior Publication Data
US 2016/0203121 A1 Jul. 14, 2016

(30) Foreign Application Priority Data
Aug. 7, 2013 (JP) ................................. 2013-163824

(51) Int. Cl.
*G10L 15/26* (2006.01)
*G06F 17/28* (2006.01)
(Continued)

(52) U.S. Cl.
CPC .......... *G06F 17/279* (2013.01); *G06F 17/271* (2013.01); *G10L 15/30* (2013.01); *G10L 25/63* (2013.01)

(58) Field of Classification Search
CPC ......... G10L 15/26; G10L 15/00; G10L 25/63; G06F 17/28
(Continued)

(56) References Cited

U.S. PATENT DOCUMENTS

| 6,363,145 B1* | 3/2002 | Shaffer | H04M 3/2281 379/265.02 |
| 2003/0179877 A1* | 9/2003 | Dezonno | H04M 3/51 379/266.07 |

(Continued)

FOREIGN PATENT DOCUMENTS

| JP | 2007-033754 A | 2/2007 |
| JP | 2009-216840 A | 9/2009 |

(Continued)

OTHER PUBLICATIONS

International Search Report for PCT Application No. PCT/JP2014/058758, dated May 20, 2014.

(Continued)

*Primary Examiner* — Seong Ah A Shin

(57) ABSTRACT

An analysis subject determination device includes: a demand period detection unit which detects, from data corresponding to audio of a dissatisfaction conversation, a demand utterance period which represents a demand utterance of a first conversation party among a plurality of conversation parties which are carrying out the dissatisfaction conversation; a negation period detection unit which detects, from the data, a negation utterance period which represents a negation utterance of a second conversation party which differs from the first conversation party; and a subject determination unit which, from the data, determines a period with a time obtained from the demand period utterance period as a start point and a time obtained from the negation utterance period after the demand utterance period (Continued)

as an end point to be an analysis subject period of a cause of dissatisfaction of the first conversation party in the dissatisfaction conversation.

7 Claims, 8 Drawing Sheets

(51) Int. Cl.
*G10L 15/00* (2013.01)
*G10L 25/63* (2013.01)
*G06F 17/27* (2006.01)
*G10L 15/30* (2013.01)

(58) Field of Classification Search
USPC .............................. 704/9, 211, 235, 251, 257
See application file for complete search history.

(56) References Cited

U.S. PATENT DOCUMENTS

| | | | | |
|---|---|---|---|---|
| 2009/0228268 A1* | 9/2009 | Kurata | ................... | G10L 17/00 704/224 |
| 2010/0114575 A1* | 5/2010 | Itoh | ....................... | G10L 15/26 704/251 |
| 2010/0332287 A1* | 12/2010 | Gates | .................... | G06F 17/277 705/7.32 |
| 2011/0010173 A1* | 1/2011 | Scott | ................... | H04M 3/42221 704/235 |
| 2012/0253807 A1* | 10/2012 | Kamano | .................. | G10L 25/63 704/240 |
| 2012/0296642 A1* | 11/2012 | Shammass | .............. | G10L 25/63 704/211 |
| 2014/0188459 A1* | 7/2014 | Fink | ...................... | G06F 17/2785 704/9 |
| 2015/0195406 A1* | 7/2015 | Dwyer | ................. | H04M 3/5175 379/265.07 |
| 2015/0262574 A1* | 9/2015 | Terao | ...................... | G10L 25/63 704/246 |
| 2015/0279391 A1* | 10/2015 | Onishi | .................... | G10L 25/63 704/254 |
| 2015/0310877 A1* | 10/2015 | Onishi | .................... | H04M 3/51 704/246 |
| 2015/0358463 A1* | 12/2015 | O'Connor | ........... | H04M 3/5166 379/88.02 |

FOREIGN PATENT DOCUMENTS

| | | |
|---|---|---|
| JP | 2010-266522 A | 11/2010 |
| JP | 2011-210100 A | 10/2011 |
| JP | 2011-237957 A | 11/2011 |
| JP | 4972107 B2 | 7/2012 |
| WO | 2010/041507 A1 | 4/2010 |

OTHER PUBLICATIONS

English translation of Written opinion for PCT Application No. PCT/JP2014/058758.

* cited by examiner

Fig. 6

| UTTERANCE NUMBER | START TIME (s) | FINISH TIME (s) | SPEAKER | VOICE RECOGNITION RESULT | ANGER RECOGNITION RESULT |
|---|---|---|---|---|---|
| | | | | ... | |
| 101 | 124.1 | 127.2 | CU | IT APPEARS SOMETHING IS WRONG, BUT I WANT TO USE IT FOR BUSINESS. | |
| 102 | 127.4 | 131.1 | OP | I APOLOGIZE FOR THE TROUBLE YOU'VE HAD. I WILL REAIR THE BROUGHT ITEM. | |
| 103 | 132.6 | 133.4 | CU | HOW LONG DOES IT TAKE TO REPAIR? | |
| 104 | 133.5 | 135.9 | OP | WELL, GENERALLY IT TAKES 10 DAYS OR SO. | |
| 105 | 135.8 | 139.0 | CU | I WANT YOU TO EXPEDITE, AS I NEED IT URGENTLY. | |
| 106 | 139.3 | 145.0 | OP | I UNDERSTAND. I AM VERY SORRY BUT, IT DEPENDS ON THE AVAILABILITY OF MAN POWER IN THE REPAIR DEPARTMENT, AND SO I'M NOT IN A POSITION TO ASSURE. | |
| 107 | 145.5 | 146.5 | CU | BUT YOU KNOW, IT HAS FAILED RIGHT AFTER I BOUGHT IT, AND IT'S A GREAT TROUBLE TO ME! | ANGER |
| 108 | 146.8 | 147.4 | OP | I AM VERY SORRY. | |
| | | | | ... | |

Fig. 7

| EXPRESSION NUMBER | PHRASE |
|---|---|
| 1 | VERB+"TAI":PARTICLE |
| 2 | VERB+"TE":PARTICLE+"HOSHII":ADJECTIVE |
| 3 | VERB+"TE":PARTICLE+"MORAE":VERB+"MASE":AUXILIARY VERB+"N":AUXILIARY VERB+"KA":PARTICLE |
| 4 | VERB+"TE":PARTICLE+"MORAE":VERB+"NAI":AUXILIARY VERB+"KA":PARTICLE |
| 5 | VERB+"MASE":AUXILIARY VERB+"N":PARTICLE+"KA":PARTICLE |
| 6 | ... |

Fig. 8

| EXPRESSION NUMBER | PHRASE |
|---|---|
| 1 | VERB+"TE":PARTICLE+"ORI":VERB+"MASE": AUXILIARY VERB+"N":AUXILIARY VERB |
| 2 | VERB+"TE":PARTICLE+"I":VERB+"MASE": AUXILIARY VERB+"N":AUXILIARY VERB |
| 3 | VERB+"TE":PARTICLE+"I":VERB+"NAI": AUXILIARY VERB |
| 4 | "DEKI":VERB+"KANE":VERB+"TE":PARTICLE+ "SHIMAU":VERB |
| 5 | "MOUSHIWAKE":NOUN+"GOZAI":AUXILIARY VERB +"MASE":AUXILIARY VERB+"N":AUXILIARY VERB |
| 6 | ... |

ANALYSIS OBJECT DETERMINATION DEVICE AND ANALYSIS OBJECT DETERMINATION METHOD

This application is a National Stage Entry of PCT/JP2014/058758 filed on Mar. 27, 2014 which claims priority from Japanese Patent Application 2013-163824 filed on Aug. 7, 2013 the contents of all of which are incorporated herein by reference, in their entirety.

TECHNICAL FIELD

The present disclosure relates to a conversation analysis technique.

BACKGROUND ART

Techniques of analyzing conversations thus far developed include a technique for analyzing phone conversation data. Such a technique is applicable, for example, to the analysis of phone conversation data in a section called call center or contact center. Hereinafter, the section specialized in dealing with phone calls from customers made for inquiries, complaints, and orders about merchandise or service will be referred to as contact center.

In many cases the voice of the customers directed to the contact center reflect the customers' needs and satisfaction level. Therefore, it is essential for the company to extract the emotion and needs of the customer from the phone conversations with the customers, in order to increase the number of repeating customers. In particular, a call in which the customer is expressing anger obviously contain dissatisfaction of the customer. Accordingly, it is indispensable for the company to analyze the cause of the dissatisfaction, to thereby improve the business level. The phone conversations from which it is desirable to extract the emotion and other factors of the speaker are not limited to those exchanged in the contact center.

Patent Literature (PTL) 1 cited below proposes a method including recognizing emotions with respect to the voice of a person A in a conversation between the person A and a person B, and calculating a degree of satisfaction of the person A utilizing the result of the emotion recognition and a calculation algorithm associated with the property of the person B such as official position, type of job, age, sex, and so forth. PTL 2 cited below proposes a method including recognizing emotions with respect to the voice of a customer in a conversation between the customer and a store clerk, calculating the degree of customer satisfaction on the basis of the result of the emotion recognition, and recording customer handling data in which the recorded data of the conversation and the degree of customer satisfaction are associated with each other. PTL 3 cited below proposes a method including inputting the voices of a call and deciding whether one of the speakers is angry.

CITATION LIST

Patent Literature

PTL 1: Japanese Patent Application Laid-open Publication No. 2011-237957
PTL 2: Japanese Patent Application Laid-open Publication No. 2011-210100
PTL 3: Japanese Patent Publication No. 4972107

SUMMARY OF INVENTION

Technical Problem

However, the methods proposed as above merely serve for calculating the degree of satisfaction of one of the conversation participants (for instance, customer), or deciding whether one of the conversation participants is angry. In other words, the methods cited above are not designed to analyze the cause of the emotion of the conversation participant.

To analyze the cause of a specific emotion of the conversation participant arising in the conversation, normally a multitude of utterance sections in the conversation are taken up as analysis object. In the case of analyzing, for example, the cause of dissatisfaction in the conversation, the utterance section expressing anger, which is one of modes of expressing a dissatisfied emotion, is taken up as analysis object. However, in many cases a large number of anger utterance sections, expressing the anger of the conversation participant, are found in the conversation in which the conversation participant is feeling dissatisfied. Accordingly, when performing the analysis of dissatisfaction cause, in other words extracting the cause of dissatisfaction from the utterances with anger that have been detected, the analysis is performed with respect to the plurality of anger utterance sections. In addition, it is desirable to also analyze the peripheral utterances in addition to the anger utterance sections, in order to analyze the cause of dissatisfaction with high accuracy. This is because the emotion of anger may be expressed a certain time after the conversation containing the cause of the anger is made, and hence it is difficult to analyze the cause of the anger from the anger utterance section alone. Thus, the accuracy in cause analysis can be improved by handling a large number of utterance sections as analysis object. Naturally, however, the analysis efficiency declines with the increase in number of utterance sections taken up as analysis object.

The disclosure has been accomplished in view of the foregoing situation, and provides a technique of efficiently analyzing the cause of dissatisfaction of a conversation participant in the dissatisfaction conversation, without compromising the analysis accuracy. Here, the dissatisfaction conversation refers to a conversation in which at least one of the conversation participants has expressed the anger emotion.

Solution to Problem

Some aspects of the disclosure are configured as follows, to solve the foregoing problem.

The first aspect relates to an analysis object determination device. The analysis object determination device according to the first aspect includes a request section detection unit that detects, from data corresponding to voices in a dissatisfaction conversation, a request utterance section representing a request utterance of a first conversation participant of a plurality of conversation participants making the dissatisfaction conversation, a negation section detection unit that detects, from the data, a negative utterance section representing a negative utterance of a second conversation participant different from the first conversation participant, and an object determination unit that determines a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation.

The second aspect relates to an analysis object determination method performed by at least one computer. The analysis object determination method according to the second aspect includes detecting, from data corresponding to voices in a dissatisfaction conversation, a request utterance section representing a request utterance of a first conversation participant of a plurality of conversation participants making the dissatisfaction conversation, detecting, from the data, a negative utterance section representing a negative utterance of a second conversation participant different from the first conversation participant, and determining a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation.

Other aspects of the disclosure may include a program that causes at least one computer to realize the configuration according to the second aspect, or a computer-readable recording medium having the mentioned program recorded thereon. The recording medium includes a tangible non-transitory medium.

Advantageous Effects of Invention

The arrangements according to the foregoing aspects enable the cause of dissatisfaction of a conversation participant in the dissatisfaction conversation to be efficiently analyzed, without compromising the analysis accuracy.

BRIEF DESCRIPTION OF DRAWINGS

These and other objects, features, and advantages will become more apparent through exemplary embodiments described hereunder with reference to the accompanying drawings.

FIG. 6 is a table showing examples of information of a part of utterance sections of an operator and a customer included in call data according to a working example, voice recognition results with respect to each of the utterance sections, and anger recognition results with respect to each of the utterance sections.

FIG. 7 is a table showing an example of a request expression list according to the working example.

FIG. 8 is a table showing an example of a negative expression list according to the working example.

DESCRIPTION OF EMBODIMENTS

Hereafter, exemplary embodiments of the present invention will be described. The following exemplary embodiments are merely examples, and the present invention is in no way limited to the configuration according to the following exemplary embodiments.

Figure 1:
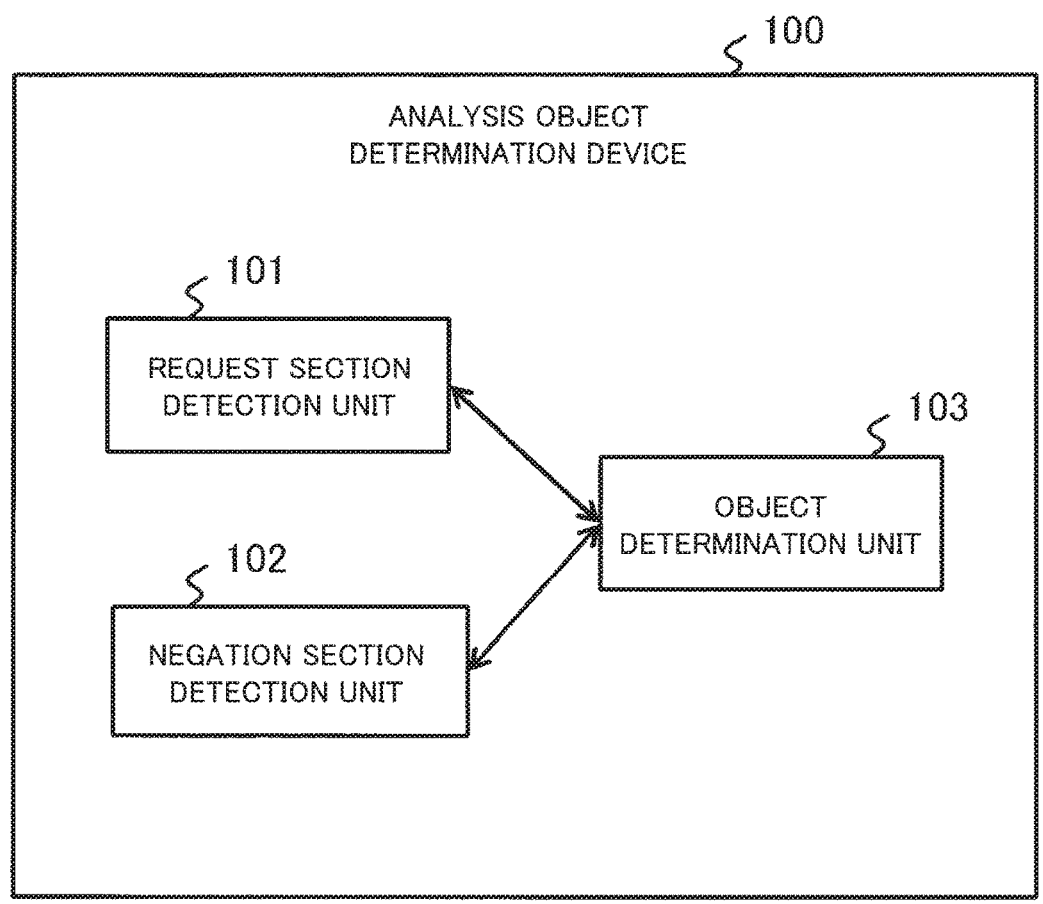
FIG. 1 is a block diagram showing a processing configuration of an analysis object determination device according to an exemplary embodiment.

FIG. 1 is a block diagram showing a processing configuration of an analysis object determination device according to the exemplary embodiment. The analysis object determination device 100 as shown in FIG. 1 includes a request utterance section detection unit 101 that detects, from data corresponding to voices in a dissatisfaction conversation, a request utterance section representing a request utterance of a first conversation participant of a plurality of conversation participants making the dissatisfaction conversation, a negation section detection unit 102 that detects, from the data, a negative utterance section representing a negative utterance of a second conversation participant different from the first conversation participant, and an object determination unit 103 that determines a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation.

The analysis object determination device 100 shown in FIG. 1 possesses a hardware configuration similar to that of a call analysis server 10 according to a detailed exemplary embodiment to be subsequently described, and the mentioned functional units can be realized when a program is executed, as in the call analysis server 10.

Figure 2:
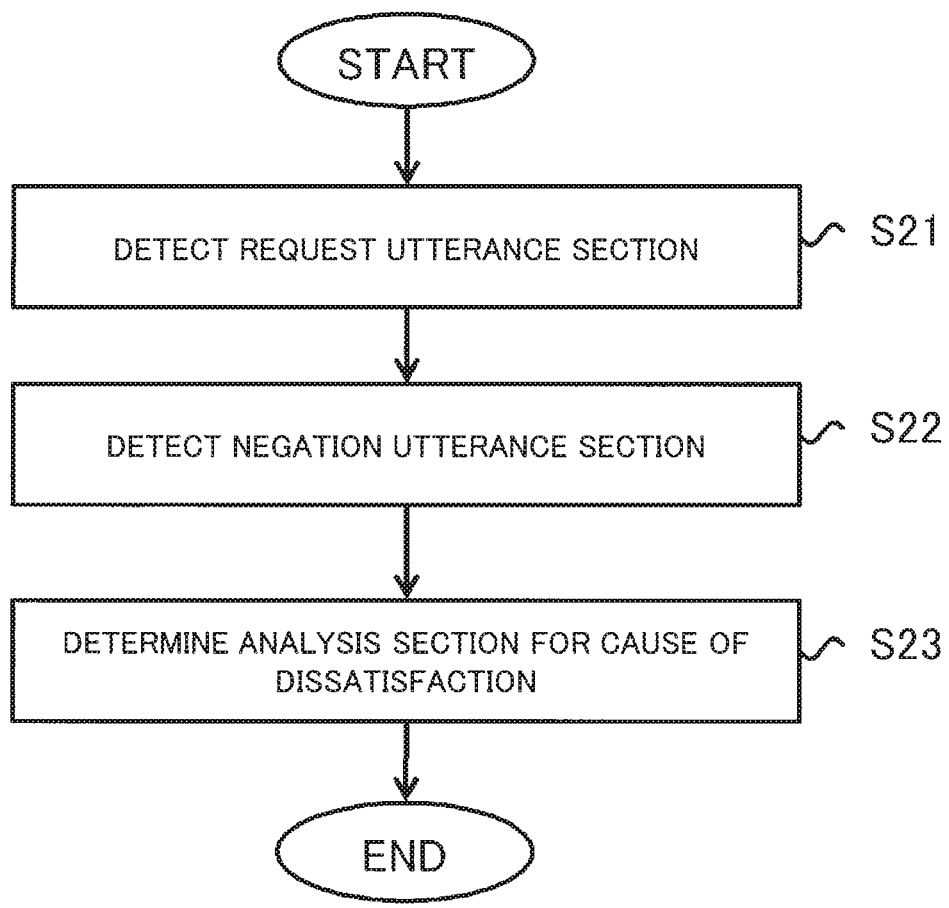
FIG. 2 is a flowchart showing an operation performed by the analysis object determination device according to the exemplary embodiment.

FIG. 2 is a flowchart showing an operation performed by the analysis object determination device 100 according to the exemplary embodiment. The analysis object determination method according to this exemplary embodiment is performed by at least one computer such as the analysis object determination device 100, and includes the process illustrated in FIG. 2. That is, the analysis object determination method includes detecting (S21), from data corresponding to voices in a dissatisfaction conversation, a request utterance section representing a request utterance of a first conversation participant of a plurality of conversation participants making the dissatisfaction conversation, detecting (S22), from the data, a negative utterance section representing a negative utterance of a second conversation participant different from the first conversation participant, and determining (S23) a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation. Steps (S21) and (S22) may be performed in a reverse order, or performed in parallel.

The dissatisfaction conversation refers, as stated earlier, to a conversation in which at least one of the conversation participants has expressed the anger emotion. The conversation refers to a situation where two or more speakers talk to each other to declare what they think, through verbal expression. The conversation may include a case where the conversation participants directly talk to each other, for example at a bank counter or at a cash register of a shop. The conversation may also include a case where the participants of the conversation located away from each other talk, for example a conversation over the phone or a TV conference. Regarding the series of voices in the conversation, a continuous section where one of the conversation participants is speaking will be referred to as utterance or utterance section. For example, a section where an amplitude wider than a predetermined value is maintained in the voice waveform of the conversation participant is detected as utterance section. Normally, the conversation is composed of the utterance sections and silent sections produced by each of the conversation participants. Here, the voice may also include a sound created by a stuff other than human, in addition to the voice of the participants. Therefore, a sound section may also constitute the utterance and the utterance section.

In this exemplary embodiment, a request utterance section containing a request utterance of a first conversation participant, and a negative utterance section containing a negative utterance of a second conversation participant are detected, from the data corresponding to the voices in the dissatisfaction conversation. The data corresponding to the voices in the dissatisfaction conversation may be voice data in which the dissatisfaction conversation is recorded, or voice text data and utterance time data acquired from the voice data through a voice recognition process. The request utterance refers to an utterance in which the first conversation participant is stating a request. The negative utterance refers to an utterance in which the second conversation participant is making a negative comment. To detect the request utterance section and the negative utterance section from the data corresponding to the voices in the dissatisfaction conversation, a plurality of methods may be employed. The details of the plurality of detection methods will be subsequently described.

In this exemplary embodiment, a section starting from a time point acquired from the request utterance section, and ending at a time point acquired from the negative utterance section subsequent to the request utterance section, is determined as analysis section with respect to the cause of dissatisfaction of the first conversation participant in the dissatisfaction conversation. The time points acquired from the request utterance section include given time points in the request utterance section such as the start time and the finish time, and time points earlier or later than the given time point in the request utterance section by a predetermined time (a few seconds). The time points acquired from the negative utterance section include given time points in the negative utterance section such as the start time and the finish time, and time points earlier or later than the given time point in the negative utterance section by a predetermined time (a few seconds). Although it is desirable to determine only the mentioned sections as analysis section in this exemplary embodiment, the utterance sections other than the mentioned sections may also be included in the analysis section.

The present inventors have focused on the fact that a conversation pattern in which a conversation participant states a request and the other conversation participant returns a negative comment to the request frequently appears in the dissatisfaction conversation, and discovered that the cause of dissatisfaction of the conversation participant who has stated a request and received a negative response is most likely to lie in the conversation pattern representing the request and the negation. In this exemplary embodiment, therefore, such a section that contains the conversation pattern representing the request and the negation, in the data corresponding to the voices in the dissatisfaction conversation, is determined as analysis section with respect to the cause of dissatisfaction. Here, the negative utterance of the second conversation participant made to the request utterance of the first conversation participant appears after the request utterance. Accordingly, in this exemplary embodiment the negative utterance section that appears after the request utterance section is selected to determine the analysis section with respect to the cause of dissatisfaction. The negative utterance section that appears after the request utterance section refers to a negative utterance section having a start time and finish time later than the start time of the request utterance section, including a negative utterance section having a start time earlier than the finish time of the request utterance section. In this exemplary embodiment, as mentioned above, a section starting from a time point acquired from the request utterance section and ending at a time point acquired from the negative utterance section later than the request utterance section is determined as section corresponding to the conversation pattern.

Determining thus the analysis section with respect to the cause of dissatisfaction in the dissatisfaction conversation allows the analysis object to be limited to the section where the cause of dissatisfaction is likely to lie, rather than handling a larger number of long utterance sections as analysis object. Despite limiting the analysis object as above, the analysis accuracy can be maintained since the section where the cause of dissatisfaction is likely to lie is identified. Therefore, the arrangement according to this exemplary embodiment improves the efficiency of the dissatisfaction cause analysis, without compromising the analysis accuracy.

Hereunder, the foregoing exemplary embodiment will be described in further details. A first exemplary embodiment will be descried below, as one of the detailed exemplary embodiments. The following exemplary embodiment represents the case where the foregoing analysis object determination device and the analysis object determination method are applied to a contact center system. In the following detailed exemplary embodiment, therefore, a phone conversation in the contact center between a customer and an operator in which the customer has expressed anger emotion corresponds to the dissatisfaction conversation. The customer and the operator correspond to the conversation participants, such that the customer corresponds to the first conversation participant and the operator corresponds to the second conversation participant.

Here, the analysis object determination device and the analysis object determination method are not only applicable to the contact center system that handles call data, but also to various systems that handle the call data. For example, the analysis object determination device and method are applicable to a phone conversation management system of the company other than the contact center. In addition, the device and method for analysis object determination are applicable to a personal computer (PC) and a terminal such as a landline phone, a mobile phone, a tablet terminal, or a smartphone, which are privately owned. Further, examples of the call data include data representing a conversation between a clerk and a customer at a bank counter or a cash register of a shop. Hereafter, the call will refer to a speech made between a speaker and another speaker, during a period from connection of the phones of the respective speakers to disconnection thereof.

First Exemplary Embodiment

[System Configuration]

Figure 3:
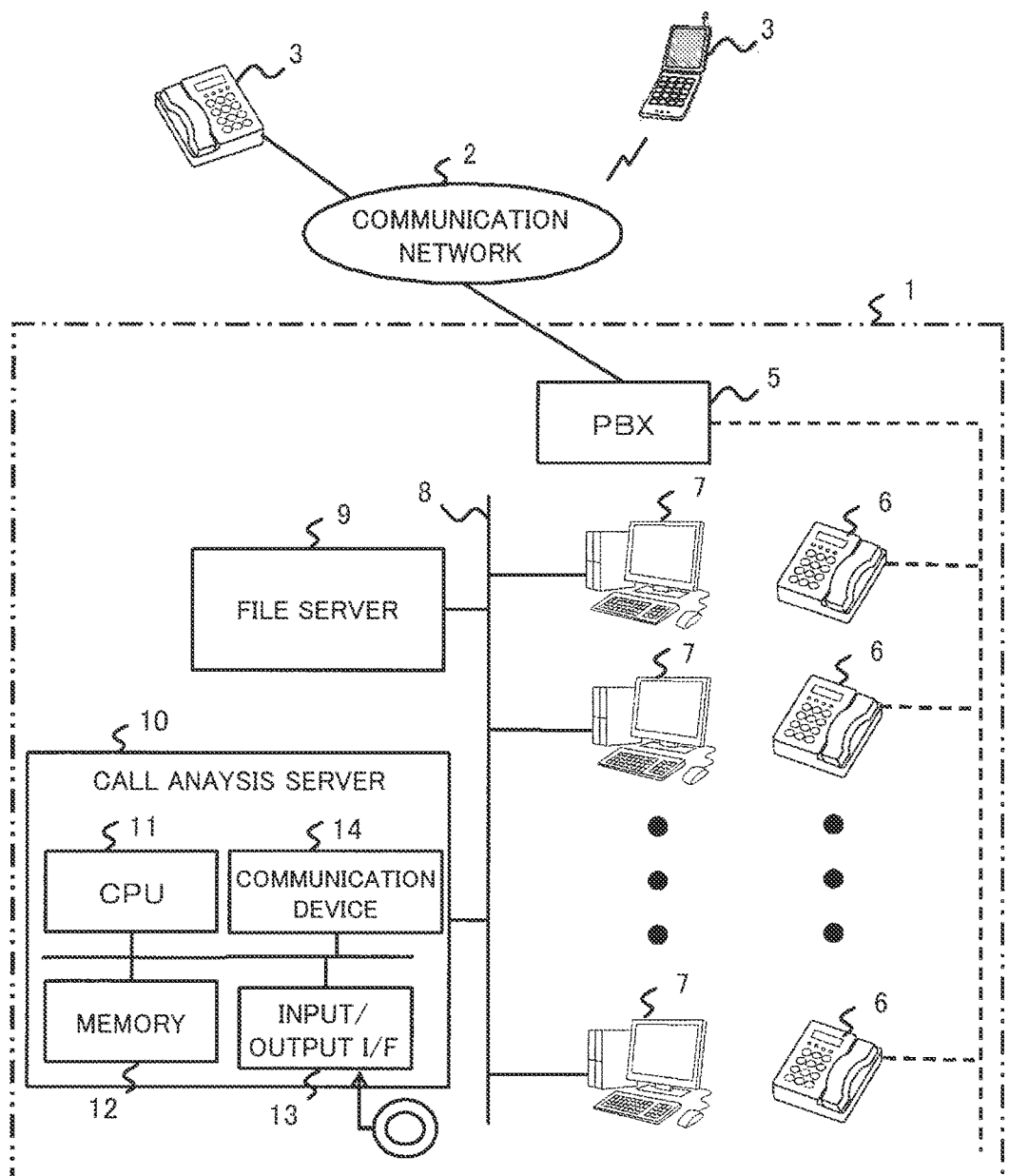
FIG. 3 is a schematic drawing showing a configuration of a contact center system according to a first exemplary embodiment.

FIG. 3 is a schematic drawing showing a configuration example of the contact center system 1 according to a first exemplary embodiment. The contact center system 1 according to the first exemplary embodiment includes a switchboard (PBX) 5, a plurality of operator phones 6, a plurality of operator terminals 7, a file server 9, and a call analysis server 10. The call analysis server 10 includes a configuration corresponding to the analysis object determination device 100 of the exemplary embodiment.

The switchboard 5 is communicably connected via a communication network 2 to a terminal utilized by the customer, such as a PC, a landline phone, a mobile phone, a tablet terminal, or a smartphone. The communication network 2 is, for example, a public network or a wireless communication network such as the internet or a public switched telephone network (PSTN). The switchboard 5 is connected to each of the operator phones 6 used by the operators of the contact center. The switchboard 5 receives a call from the customer and connects the call to the operator phone 6 of the operator who has picked up the call.

The operators respectively utilize the operator terminals 7. Each of the operator terminals 7 is a general-purpose computers such as a PC connected to a communication network 8, for example a local area network (LAN), in the contact center system 1. The operator terminals 7 each record, for example, voice data of the customer and voice data of the operator in the phone conversation between the operator and the customer. The voice data of the customer and the voice data of the operator may be separately generated from mixed voices through a predetermined speech processing method. Here, this exemplary embodiment is not intended to limit the recording method and recording device of the voice data. The voice data may be generated by another device (not shown) than the operator terminal 7.

The file server 9 is constituted of a generally known server computer. The file server 9 stores the call data representing the phone conversation between the customer and the operator, together with identification information of the call. The call data includes time information and pairs of the voice data of the customer and the voice data of the operator. The voice data may include sounds inputted through the customer phone 3 and the operator terminal 7, in addition to the voices of the customer and the operator. The file server 9 acquires the voice data of the customer and the voice data of the operator from other devices that record the voices of the customer and the operator, for example the operator terminals 7.

The call analysis server 10 analyzes each of the call data stored in the file server 9, and outputs an analysis result according to the requirement of the user. The call analysis server 10 may display the analysis result on its own display device, or on the browser of the user terminal using a WEB server function. The call analysis server 10 in the first exemplary embodiment determines the analysis section with respect to the cause of dissatisfaction of the customer, on the basis of the data of the dissatisfaction call in which the customer has expressed the dissatisfaction.

The call analysis server 10 has, as shown in FIG. 3, a hardware configuration including a central processing unit (CPU) 11, a memory 12, an input/output interface (I/F) 13, and a communication device 14. The memory 12 may be, for example, a random access memory (RAM), a read only memory (ROM), a hard disk, or a portable storage medium. The input/output I/F 13 is connected to a device that accepts inputs from the user such as a keyboard or a mouse, a display device, and a device that provides information to the user such as a printer. The communication device 14 makes communication with the file server 9 through the communication network 8. However, the hardware configuration of the call analysis server 10 is not specifically limited.

[Processing Arrangement]

Figure 4:
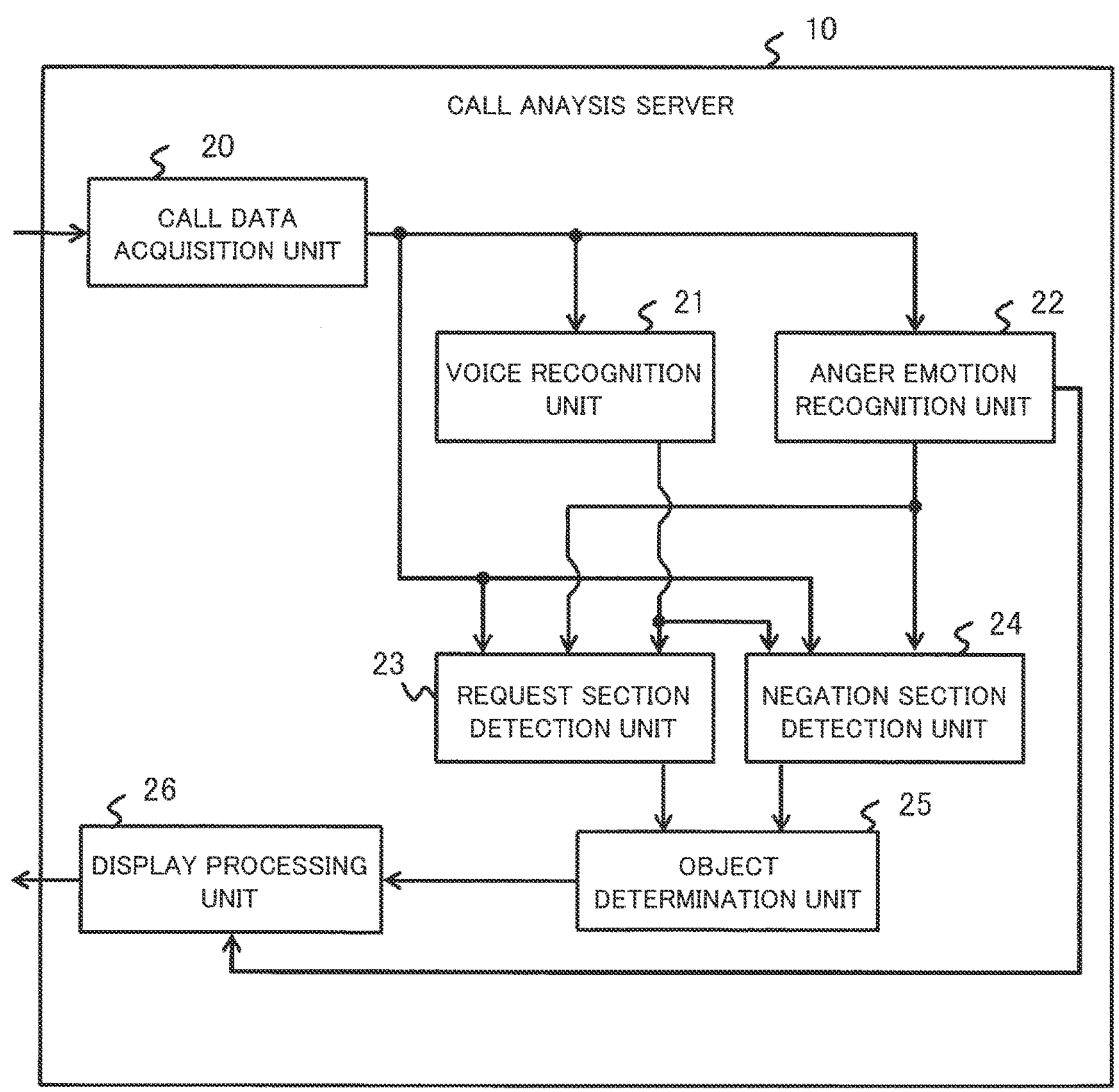
FIG. 4 is a block diagram showing a processing configuration of a call analysis server according to the first exemplary embodiment.

FIG. 4 is a block diagram showing a configuration example of the call analysis server 10 according to the first exemplary embodiment. The call analysis server 10 according to the first exemplary embodiment includes a call data acquisition unit 20, a voice recognition unit 21, an anger emotion recognition unit 22, a request section detection unit 23, a negation section detection unit 24, an object determination unit 25, and a display processing unit 26. These processing units may be realized, for example, by the CPU 11 upon executing the program stored in the memory 12. Here, the program may be installed and stored in the memory 12, for example from a portable recording medium such as a compact disc (CD) or a memory card, or another computer on the network, through the input/output I/F 13.

The call data acquisition unit 20 acquires, from the file server 9, the call data of a plurality of calls to be analyzed, together with the identification information of the corresponding call. The plurality of call data may be acquired through the communication between the call analysis server 10 and the file server 9, or through a portable recording medium.

The voice recognition unit 21 recognizes the voice with respect to each of the utterance sections in the voice data of the operator and the customer contained in the call data. Accordingly, the voice recognition unit 21 acquires, from the call data, voice text data and speech time data associated with the operator's voice and the customer's voice. Here, the voice text data refers to character data converted into a text from the voice outputted from the customer or operator. The speech time represents the time when the speech corresponding to the voice text data has been made, and includes the start time and the end time of the utterance section from which the voice text data has been acquired. In this exemplary embodiment, the voice recognition may be performed through a known method. The voice recognition process itself and the voice recognition parameters to be employed for the voice recognition are not specifically limited.

The anger emotion recognition unit 22 recognizes the anger emotion with respect to each of the utterance sections in the voice data of the customer included in the call data. The anger emotion recognition unit 22 acquires prosodic feature information from the voice in each of the utterance sections. The anger emotion recognition unit 22 then decides, on the basis of the prosodic feature information, whether the anger emotion is expressed in the utterance sections of the customer. The utterance section in which the anger emotion is expressed will be referred to as anger utterance section. Examples of the prosodic feature information include fundamental frequency and voice power. Here, the anger emotion recognition unit 22 may employ other feature amount than the prosodic feature amount, for example word feature amount, or employ the prosodic feature amount in combination with other types of feature amount. In the case of employing the word feature amount, the voice text data acquired by the voice recognition unit 21 may be utilized. In this exemplary embodiment, a known method may be employed for the anger emotion recognition (see PTL 3 cited above), and the method of the anger emotion recognition is not specifically limited.

The anger emotion recognition unit 22 may decide whether the utterance section of the customer represents anger, using an identification model (identification function) based on the support vector machine (SVM). To be more detailed, the anger emotion recognition unit 22 may store in advance an identification model that may be obtained by providing the prosodic feature information of the utterance section representing the "anger" and "normal" as learning data, to allow the identification model to learn to distinguish between the "anger" and "normal". To allow the identification model to learn and to perform the data identification based on the identification model, known techniques of the machine learning and data identification (pattern recognition) may be employed.

Through the mentioned process, the anger emotion recognition unit 22 detects the anger utterance section of the customer. As a result, the start time and the finish time of the anger utterance section are acquired.

The respective utterance sections of the operator and the customer may be detected from the voice data included in the call data acquired by the call data acquisition unit 20 before the recognition process is performed by the voice recognition unit 21 and the anger emotion recognition unit 22. With such detection, the start time and the finish time of the utterance sections are acquired. In this exemplary embodiment, the detection method of the utterance section is not specifically limited. The utterance section may be detected through the voice recognition performed by the voice recognition unit 21. Alternatively, the call data acquisition unit 20 may acquire the information of the utterance section, together with the call data.

The request section detection unit 23 and the negation section detection unit 24 respectively correspond to the request section detection unit 101 and the negation section detection unit 102 described above. The request section detection unit 23 and the negation section detection unit 24 handle the call data (dissatisfaction call data) decided by the anger emotion recognition unit 22 as containing the anger utterance section.

The request section detection unit 23 detects the request utterance section out of the utterance sections of the customer included in possible request sections located at predetermined temporal positions in the dissatisfaction call, utilizing as reference the anger utterance section detected by the anger emotion recognition unit 22. To detect the request utterance section, first the request section detection unit 23 determines the possible request sections on the basis of the anger utterance section.

The information of the predetermined temporal position for determining the possible request section is stored in advance in the request section detection unit 23. The predetermined temporal position may be set by the time, or by the number of utterance sections of the customer. In addition, a reference time point in the anger utterance section for determining the temporal position of the possible request section in the dissatisfaction call is set at the start time, the finish time, or any other given time point in the anger utterance section. In the case where a plurality of anger utterance sections are detected in a single dissatisfaction call, the reference time point for determining the temporal position of the possible request section may be located at a given position in one of the plurality of anger utterance sections detected, or at a given position in a section in which the plurality of anger utterance sections are merged. The request utterance of the customer that may be the trigger of the cause of dissatisfaction is supposed to be made before the utterance with anger. Accordingly, it is desirable that the start time and the finish time of the possible request section are set at a position a predetermined time earlier than the anger utterance section, or before a predetermined utterance section.

The request section detection unit 23 may decide whether a word or a word string included in a request expression list is contained in the result of the voice recognition by the voice recognition unit 21 with respect to each of the utterance sections of the customer in the possible request section, and detect the request utterance section on the basis of the decision result. In this case, the request section detection unit 23 may determine the utterance section containing a word or a word string included in the request expression list as being a request utterance section, and determine the utterance section without such word or word string as not being a request utterance section. A plurality of words and phrases expressing a request, such as "want", "want you to", or "would you" are included in the request expression list as word or word string. The request expression list is stored in advance in the request section detection unit 23. The request section detection unit 23 may detect the request section utilizing the prosodic feature information in the possible request section, in addition to the voice recognition result provided by the voice recognition unit 21. For example, the request section detection unit 23 may determine as request utterance section with preference an utterance section in which the fundamental frequency of the tail of the word is higher.

The request section detection unit 23 may detect the request utterance section by the following method, together with or instead of the foregoing detection method. The request section detection unit 23 may possess an identification model (identification function) such as SVM, and give the voice recognition result (word feature information) with respect to the utterance section of the customer in the possible request section to the identification model, to thereby decide whether the utterance section is a request utterance section. In this case, an identification model to which the request utterance sections which are positive examples and other utterance sections which are negative examples are given as learning data, with the word feature information adopted as feature amount, so as to learn to distinguish between the request utterance sections and other utterance sections, is stored in advance in the request section detection unit 23. The identification model may also be referred to as request utterance model. In this case, the request section detection unit 23 determines as request utterance section, on the basis of a request utterance score of each utterance section of the customer in the possible request section outputted from the request utterance, the utterance section that has gained the request utterance score higher than a predetermined threshold. The word feature information is associated in advance, for example, with the phrases contained in the voice text data extracted by the voice recognition unit 21, and retained by the voice recognition unit 21. In addition, the request utterance model may be an identification model that utilizes the word feature information and the prosodic feature information as feature amount. In this case, at least one of the word feature information and the prosodic feature information regarding the utterance sections of the customer in the possible request section is inputted to the request utterance model.

The negation section detection unit 24 detects the negative utterance section out of the utterance sections of the operator contained in the possible negation section located at a predetermined temporal position in the dissatisfaction call, on the basis of at least one of the anger utterance section detected by the anger emotion recognition unit 22 and the request utterance section detected by the request section detection unit 23. To detect the negative utterance section, first the negation section detection unit 24 determines the possible negation section on the basis of at least one of the anger utterance section and the request utterance section. The information of the predetermined temporal position for determining the possible negation section is stored in advance in the negation section detection unit 24. The predetermined temporal position may be set by the time, or by the number of utterance sections of the customer. In addition, the possible negation section may be the same section as the possible request section.

The negative utterances of the operator contained in the conversation pattern that frequently appears in the dissatisfaction call are highly likely to be associated with the utterance with anger of the customer. In addition, the negative utterance of the operator may appear when the operator spontaneously utters a negative word and when the operator denies a request of the customer. Out of such two occasions, the negative utterance of the operator made in response to the customer's request is more likely to be associated with the utterance with anger of the customer and to contain the cause of the dissatisfaction, than the spontaneous negative utterance of the operator. In this exemplary embodiment, therefore, the reference time point for determining the temporal position of the possible negation section in the dissatisfaction call is set in consideration of at least one of the anger utterance section and the request utterance section. In other words, the reference point is set at a given time point in the anger utterance section, a given time point in the request utterance section, or a given time point in a section determined on the basis of the anger utterance section and the request utterance section. In the case where a plurality of anger utterance sections and a plurality of request utterance sections are detected from a single dissatisfaction call, the reference time point for determining the temporal position of the possible negation section is set at a given time point in a section determined on the basis of the plurality of anger utterance sections and the plurality of request utterance sections that have been detected. However, taking into account the mentioned correlation between the negative utterance of the operator and the anger and dissatisfaction of the customer, the negative utterance of the operator likely to contain the cause of dissatisfaction is likely to appear at a point before the anger utterance section of the customer and after the request utterance of the customer. Therefore, it is desirable to set the start time of the possible negation section at a point earlier than the anger utterance section by a predetermined time or earlier than a predetermined utterance section, and later than the possible request section by a predetermined time or later than a predetermined utterance section.

The negation section detection unit 24 may decide whether a word or word string included in the negative expression list is contained in the voice recognition result provided by the voice recognition unit 21 with respect to each of the utterance sections of the operator in the possible negation section, and detect the negative utterance section on the basis of the decision result. In this case, the negation section detection unit 24 may determine the utterance section containing the word or word string included in the negative expression list as being a negative utterance section, and the utterance section without such word or word string as not being a negative utterance section. A plurality of phrases expressing negation, such as [shiteorimasen (Japanese)] ("we don't ~" in English), [dekikanemasu (Japanese)] ("we can't~" in English) are specified as word or word string to be included in the negative expression list. In addition, phrases expressing apology such as [zannennagara (Japanese)] ("we are afraid ~" in English), [moushiwakearimasenga (Japanese)] ("sorry to say ~" in English) may also be specified as word or word string to be included in the negative expression list. This is because the apology mentioned by the operator in response to the request of the customer implies the negation of the request. The negation expression list is stored in advance in the negation section detection unit 24. The negation section detection unit 24 may detect the negation section utilizing the prosodic feature information in the possible negation section, in addition to the voice recognition result provided by the voice recognition unit 21. For example, the negation section detection unit 24 may determine as negative utterance section with preference an utterance section in which the speed of utterance is slower.

The negation section detection unit 24 may detect the negative utterance section by the following method, together with or instead of the foregoing detection method. The negation section detection unit 24 may possess an identification model (identification function) such as SVM, and give the voice recognition result (word feature information) with respect to the utterance section of the customer in the possible negation section to the identification model, to thereby decide whether the utterance section is a negative utterance section. In this case, an identification model to which the negative utterance sections which are positive examples and other utterance sections which are negative examples are given as learning data, with the word feature information adopted as feature amount, so as to learn to distinguish between the negative utterance sections and other utterance sections, is stored in advance in the negation section detection unit 24. The identification model may also be referred to as negation utterance model. In this case, the negation section detection unit 24 determines as negative utterance section, on the basis of a negation utterance score of each utterance section of the customer in the possible negation section outputted from the negation utterance, the utterance section that has gained the negation utterance score higher than a predetermined threshold. The word feature information is associated in advance, for example, with the phrases contained in the voice text data extracted by the voice recognition unit 21, and retained by the voice recognition unit 21. In addition, the negation utterance model may be an identification model that utilizes the word feature information and the prosodic feature information as feature amount. In this case, at least one of the word feature information and the prosodic feature information regarding the utterance sections of the customer in the possible negation section is inputted to the negation utterance model.

The object determination unit 25 corresponds to the object determination unit 103 referred to above. The object determination unit 25 determines as analysis section for the cause of dissatisfaction of the customer, a section starting from a point acquired from the request utterance section detected by the request section detection unit 23 and ending at a point acquired from the negative utterance section detected by the negation section detection unit 24 and later than the request utterance section. Further, in the case where the request section detection unit 23 has detected a plurality of request utterance sections and the negation section detection unit 24 has detected a plurality of negative utterance sections, the object determination unit 25 determines as analysis section a section between the start time of the request utterance section and the finish time of the negative utterance section that has the latest finish time among the negative utterance sections having the start time and finish time later than the mentioned start time of the request utterance section, and having the start time earlier than the start time of the request utterance section following the mentioned request utterance section and temporally adjacent thereto. Then the object determination unit 25 may determine the next analysis section in the same way as above, on the basis of the start time of the mentioned request utterance section that follows. In the case where a request utterance section and a negative utterance section temporally adjacent thereto in the dissatisfaction call are distant from each other by a time exceeding a predetermined threshold, the object determination unit 25 may exclude such negative utterance section when determining the analysis section, because it is probable that the negative utterance is not associated with the request of the customer.

The display processing unit 26 generates drawing data, in which drawing elements each representing an anger utterance section detected by the anger emotion recognition unit 22 and drawing elements each representing an analysis section determined by the object determination unit 25 are aligned in a chronological order of the call, with respect to each dissatisfaction call. The display processing unit 26 causes the display device to display an analysis result screen on the basis of such drawing data, the display device being connected to the call analysis server 10 via the input/output I/F 13. The display processing unit 26 may also be given a WEB server function, so as to cause a WEB client device to display the drawing data.

Operation Example

Figure 5:
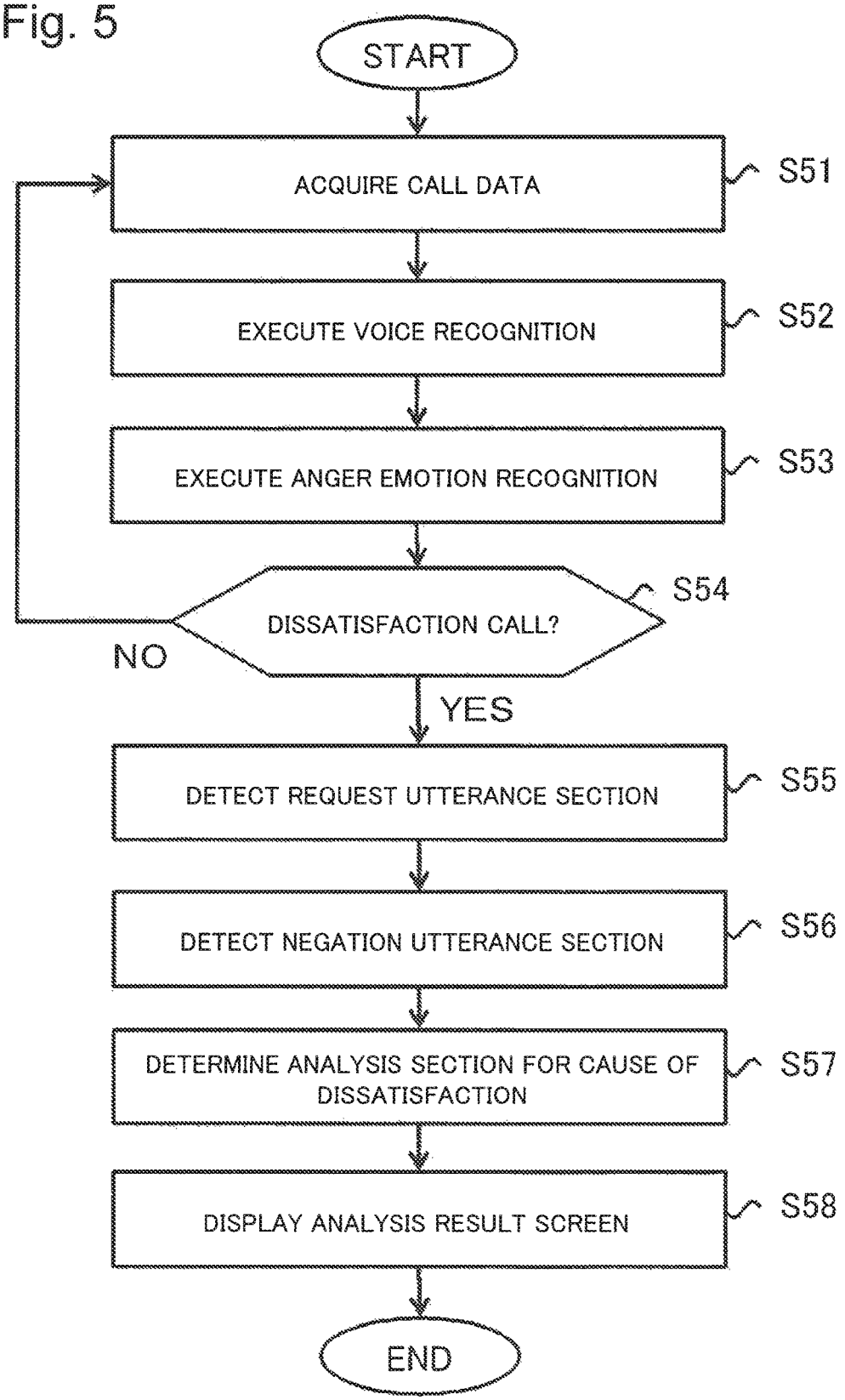
FIG. 5 is a flowchart showing an operation performed by the call analysis server according to the first exemplary embodiment.

Hereunder, the analysis object determination method according to the first exemplary embodiment will be described with reference to FIG. 5. FIG. 5 is a flowchart showing the operation performed by the call analysis server 10 according to the first exemplary embodiment. Although the call analysis server 10 will be described as subject of the following operations, the functional units included in the call analysis server 10 may serve as the subject of the operation.

The call analysis server 10 acquires the call data (S51). For example, the call analysis server 10 acquires a piece of call data out of a plurality of call data stored in the file server 9.

Then the call analysis server 10 performs voice recognition with respect to each of the utterance sections in the voice data of the operator and the customer contained in the acquired call data (S52). The specific processing method is as described above with reference to the voice recognition unit 21.

The call analysis server 10 performs the anger emotion recognition with respect to each of the utterance sections in the voice data of the customer contained in the acquired call data (S53). However, in the case of employing the word feature information instead of the prosodic feature information for the anger emotion recognition, the call analysis server 10 performs the anger emotion recognition with respect to the voice recognition result obtained at (S52). The specific processing method is as described above with reference to the anger emotion recognition unit 22. Through the mentioned recognition process, the call analysis server 10 detects the anger utterance section of the customer out of the call data.

The call analysis server 10 decides whether the call data is a dissatisfaction call (S54). More specifically, the call analysis server 10 decides that the call data in which the anger utterance section has been detected at (S53) is a dissatisfaction call (S54; YES), and the call data in which the anger utterance section has not been detected is not a dissatisfaction call (S54; NO). The call analysis server 10 acquires another call data (S51) in the case where the call data is decided not to be a dissatisfaction call (S54; NO).

In the case where the call data is decided to be a dissatisfaction call (S54; YES), the call analysis server 10 detects the request utterance section out of the utterance sections of the customer contained in the possible request section (S55). At (S55), first the call analysis server 10 determines the possible request section on the basis of the anger utterance section detected at (S53). The method of determining the possible request section is as described above with reference to the request section detection unit 23. Likewise, the method of detecting the request utterance section is also as described above with reference to the request section detection unit 23.

Further, the call analysis server 10 detects the negative utterance section out of the utterance sections of the operator contained in the possible negation section (S56). At (S56), first the call analysis server 10 determines the possible negation section on the basis of at least one of the anger utterance section detected at (S53) and the request utterance section detected at (S55). The method of determining the possible negation section is as described above with reference to the negation section detection unit 24. Likewise, the method of detecting the negative utterance section is also as described above with reference to the negation section detection unit 24.

The call analysis server 10 determines as analysis section for the cause of dissatisfaction of the customer (S57) on the basis of the request utterance section detected at (S55) and the negative utterance section detected at (S56). The analysis section starts from a point acquired from the request utterance section and ends at a point acquired from the negative utterance section later than the request utterance section. Further, in the case where a plurality of request utterance sections have been detected at (S55) and a plurality of negative utterance sections have been detected at (S56), the call analysis server 10 determines as analysis section a section described below. Specifically, the call analysis server 10 determines as analysis section a section between the start time of the request utterance section and the finish time of the negative utterance section that has the latest finish time among the negative utterance sections having the start time and finish time later than the mentioned start time of the request utterance, and having the start time earlier than the start time of the request utterance section following the mentioned request utterance section and temporally adjacent thereto.

The call analysis server 10 displays, with respect to each of the in the dissatisfaction call, the analysis result screen in which the drawing elements representing the anger utterance section detected at (S53) and the drawing elements representing the analysis section determined at (S57) are aligned in the chronological order in the dissatisfaction call (S58).

Although a plurality of steps are sequentially listed in the flowchart of FIG. 5, the process to be performed according to this exemplary embodiment is not limited to the sequence shown in FIG. 5. For example, steps (S55) and (S56) may be performed in a reverse order, or in parallel.

Advantageous Effects of First Exemplary Embodiment

In the first exemplary embodiment, as described above, the voice recognition and the anger emotion recognition are executed with respect to the call data, and it is decided whether the call data is a dissatisfaction call, on the basis of the result of the anger emotion recognition. Then the request utterance section and the negative utterance section are detected from the data corresponding to the voices in the dissatisfaction call. The request utterance section is detected out of the utterance sections of the customer contained in the possible request section in the dissatisfaction call, and the negative utterance section is detected out of the utterance sections of the operator contained in the possible negation section in the dissatisfaction call. A section that is likely to contain the request utterance is determined as possible request section on the basis of the temporal relationship with the anger utterance section, and a section that is likely to contain the negative utterance is determined as possible negation section on the basis of the temporal relationship with at least one of the anger utterance section and the request utterance section. Such an arrangement enables the request utterance section and the negative utterance section to be detected with higher efficiency and high accuracy, compared with the case of detecting the utterance sections to be analyzed out of all the utterance sections.

In the first exemplary embodiment, in addition, a section starting from a point acquired from the request utterance section and ending at a point acquired from the negative utterance section later than the request utterance section is determined as analysis section for the cause of dissatisfaction of the customer in the dissatisfaction call. Accordingly, with the first exemplary embodiment, only such a conversation section that are likely to contain the cause of dissatisfaction of the customer, in other words the section that represents a conversation pattern in which the request of the customer is refused by the operator is selected as analysis object, instead of taking up all the anger utterance sections that represent the anger of the speaker as analysis object. Therefore, the analysis efficiency can be improved without compromising the analysis accuracy.

In the first exemplary embodiment, further, in the case where a plurality of request utterance sections and a plurality of negative utterance sections have been detected, a section between the start time of the request utterance section and the finish time of the negative utterance section that has the latest finish time among the negative utterance sections having the start time and finish time later than the mentioned start time of the request utterance, and having the start time earlier than the start time of the request utterance section following the mentioned request utterance section and temporally adjacent thereto, is determined as analysis section. The negative utterance of the operator that is likely to contain the cause of dissatisfaction is, as stated above, made when the operator refuses the request of the customer, and hence appears after the request utterance of the customer. Thus, the arrangement according to the first exemplary embodiment enables the analysis section to be determined from among the negative utterance sections that are likely to contain the cause of dissatisfaction, out of the utterance sections that represent the negative utterance of the operator, and thereby improves the analysis efficiency without compromising the analysis accuracy.

Hereunder, the foregoing exemplary embodiment will be described in further details, with reference to working examples cited below. It should be noted, however, that the present invention is in no way limited to the following working examples.

Working Example

FIG. 6 is a table showing examples of information of a part of utterance sections of the operator and the customer included in the call data according to the working example, voice recognition results with respect to each of the utterance sections, and anger recognition results with respect to each of the utterance sections. In FIG. 6, CU denotes the customer, OP denotes the operator, and utterance numbers are the information for identifying the utterance section.

According to the example of FIG. 6, the utterance section numbered as 107 is recognized as anger utterance section. The call analysis server 10 (request section detection unit 23) determines as possible request section, for example, the section between the point earlier than the start time of the anger utterance section (145.5 seconds) by a predetermined time (40 seconds) and the point later than the finish time of the anger utterance section (146.5 seconds) by a predetermined time (10 seconds). More specifically, the section between 105.5 seconds and 156.5 seconds is determined as possible request section, and the call analysis server 10 detects the request utterance section out of the utterance sections of the customer in the possible request section.

Likewise, the call analysis server 10 (negation section detection unit 24) determines as possible negation section, for example, the section between the point earlier than the start time of the anger utterance section (145.5 seconds) by a predetermined time (30 seconds) and the point later than the finish time of the anger utterance section (146.5 seconds) by a predetermined time (20 seconds). More specifically, the section between 115.5 seconds and 166.5 seconds is determined as possible negation section, and the call analysis server 10 detects the negative utterance section out of the utterance sections of the operator in the possible negation section.

FIG. 7 is a table showing an example of the request expression list according to the working example. The call analysis server 10 (request section detection unit 23) contains the request expression list shown in FIG. 7, and detects the request utterance section utilizing such a request expression list. In the example shown in FIG. 6, the voice recognition result of the utterance section of the customer numbered as 101 contains the phrase corresponding to the expression number 1 in FIG. 7, and the voice recognition result of the utterance section of the customer numbered as 105 contains the phrase corresponding to the expression number 2 in FIG. 7. Accordingly, the call analysis server 10 detects the utterance section numbered as 101 and the utterance section numbered as 105, as request utterance section.

FIG. 8 is a table showing an example of the negative expression list according to the working example. The call analysis server 10 (negation section detection unit 24) contains the negative expression list shown in FIG. 8, and detects the negative utterance section utilizing such a negative expression list. The negative expression list in FIG. 8 also includes phrases representing apology, such as the phrase included in the expression numbered as 5. In the example shown in FIG. 6, the voice recognition result of the utterance section of the operator numbered as 102 contains the phrase corresponding to the expression number 5 in FIG. 8, and the voice recognition result of the utterance section of the operator numbered as 106 contains the phrase corresponding to the expression numbers 4 and 5 in FIG. 8. Accordingly, the call analysis server 10 detects the utterance section numbered as 102 and the utterance section numbered as 106, as negative utterance section.

In this working example, the call analysis server 10 (object determination unit 25) determines the section between the start time of the request utterance section and the finish time of the negative utterance section as analysis section with respect to the cause of dissatisfaction of the customer. More specifically, the section between the start time of the request utterance section numbered as 101 (124.1 seconds) and the finish time of the negative utterance section numbered as 102 (131.1 seconds) is determined as first analysis section, and the section between the start time of the request utterance section numbered as 105 (135.8 seconds) and the finish time of the negative utterance section numbered as 106 (145.0 seconds) is determined as second analysis section. In this working example, the negative expression list includes the phrases expressing apology, and resultantly the utterance section numbered as 102 has been detected as negative utterance section. However, it is not mandatory that the negative expression list includes the phrases expressing apology, and the utterance section numbered as 102 may remain undetected as negative utterance section.

[Variation]

In the first exemplary embodiment, the request utterance section is detected out of the possible request sections, and the negative utterance section is detected out of the possible negation sections. However, the request utterance section and the negative utterance section may be detected from the entirety of the dissatisfaction call, though in this case the detection efficiency is degraded.

Further, the call analysis server 10 may be without the voice recognition unit 21 and the anger emotion recognition unit 22, and another device may include the voice recognition unit 21 and the anger emotion recognition unit 22. In this case, the call analysis server 10 acquires, together with the call data, the processing results of the voice recognition unit 21 and the anger emotion recognition unit 22 included in such another device. In this case, steps (S52) and (S53) may be performed by such another device than the call analysis server 10, in the operation example shown in FIG. 5.

A part or the whole of the foregoing exemplary embodiment and the variations thereof may be defined as supplementary notes cited hereunder. However, the exemplary embodiment and the variations are not limited to the following supplementary notes.

(Supplementary Notes 1)

An analysis object determination device including a request section detection unit that detects, from data corresponding to voices in a dissatisfaction conversation, a request utterance section representing a request utterance of a first conversation participant of a plurality of conversation participants making the dissatisfaction conversation, a negation section detection unit that detects, from the data, a negative utterance section representing a negative utterance of a second conversation participant different from the first conversation participant, and an object determination unit that determines a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation.

(Supplementary Notes 2)

The analysis object determination device according to Supplementary Notes 1, wherein the object determination unit determines as the analysis section, in the case where the request section detection unit has detected a plurality of request utterance sections and the negation section detection unit has detected a plurality of negative utterance sections, a section between a start time of a first request utterance section and a finish time of a negative utterance section that has a latest finish time among the negative utterance sections having the start time and finish time later than the start time of the first request utterance section, and having the start time earlier than the start time of a second request utterance section following the first request utterance section and temporally adjacent to the first request utterance section.

(Supplementary Notes 3)

The analysis object determination device according to Supplementary Notes 1 or 2, further including an anger emotion recognition unit that detects an anger utterance section representing an anger emotion of the first conversation participant, from voice data of the dissatisfaction conversation, wherein the request section detection unit detects the request utterance section out of utterance sections of the first conversation participant contained in a possible request section located in a predetermined temporal position in the dissatisfaction conversation, based on the anger utterance section detected by the anger emotion recognition unit, and the negation section detection unit detects the negative utterance section out of utterance sections of the second conversation participant contained in a possible negation section located in a predetermined temporal position in the dissatisfaction conversation, based on at least one of the anger utterance section detected by the anger emotion recognition unit and the request utterance section detected by the request section detection unit.

(Supplementary Notes 4)

The analysis object determination device according to Supplementary Notes 3, further including a voice recognition unit that executes voice recognition with respect to a given utterance section contained in the voice data of the dissatisfaction conversation, wherein the request section detection unit decides whether a word or a word string included in a request expression list is contained in a result of the voice recognition by the voice recognition unit with respect to each of the utterance sections of the first conversation participant in the possible request section, and detects the request utterance section based on a decision result, and the negation section detection unit decides whether a word or a word string included in a negative expression list is contained in the result of the voice recognition by the voice recognition unit with respect to each of the utterance sections of the second conversation participant in the possible request section, and detects the negative utterance section based on a decision result.

(Supplementary Notes 5)

The analysis object determination device according to Supplementary Notes 3 or 4, further including the voice recognition unit that executes voice recognition with respect to a given utterance section contained in the voice data of the dissatisfaction conversation, wherein the request section detection unit gives the voice recognition result provided by the voice recognition unit with respect to each of the utterance sections of the first conversation participant in the possible request section to a request utterance model subjected to machine learning, and detects the request utterance section based on a request utterance score obtained from the request utterance model, and the negation section detection unit gives the voice recognition result provided by the voice recognition unit with respect to each of the utterance sections of the second conversation participant in the possible negation section to a negative utterance model subjected to machine learning, and detects the negative utterance section based on a negative utterance score obtained from the negative utterance model.

(Supplementary Notes 6)

An analysis object determination method performed by at least one computer, the method including detecting, from data corresponding to voices in a dissatisfaction conversation, a request utterance section representing a request utterance of a first conversation participant of a plurality of conversation participants making the dissatisfaction conversation, detecting, from the data, a negative utterance section representing a negative utterance of a second conversation participant different from the first conversation participant, and determining a section in the data starting from a time point acquired from the request utterance section and ending at a time point acquired from the negative utterance section subsequent to the request utterance section, as analysis section with respect to a cause of dissatisfaction of the first conversation participant of the dissatisfaction conversation.

(Supplementary Notes 7)

The analysis object determination method according to Supplementary Notes 6, wherein, in the determining the analysis section, in the case where a plurality of request utterance sections are detected and a plurality of negative utterance sections are detected, a section between a start time of a first request utterance section and a finish time of a negative utterance section that has a latest finish time among the negative utterance sections having the start time and finish time later than the start time of the first request utterance section, and having the start time earlier than the start time of a second request utterance section following the first request utterance section and temporally adjacent to the first request utterance section is determined as the analysis section.

(Supplementary Notes 8)

The analysis object determination method according to Supplementary Notes 6 or 7, further including detecting an anger utterance section representing an anger emotion of the first conversation participant, from voice data of the dissatisfaction conversation, wherein in the detecting the request utterance section, the request utterance section is detected out of utterance sections of the first conversation participant contained in a possible request section located in a predetermined temporal position in the dissatisfaction conversation, based on the detected anger utterance section, and in the detecting the negative utterance section, the negative utterance section is detected out of utterance sections of the second conversation participant contained in a possible negation section located in a predetermined temporal position in the dissatisfaction conversation, based on at least one of the detected anger utterance section and the detected request utterance section.

(Supplementary Notes 9)

The analysis object determination method according to Supplementary Notes 8, further including executing a voice recognition with respect to a given utterance section contained in the voice data of the dissatisfaction conversation, wherein in detecting the request utterance section, whether a word or a word string included in a request expression list is contained in a result of the voice recognition with respect to each of the utterance sections of the first conversation participant in the possible request section is decided and the request utterance section is detected based on a decision result, and in detecting the negative utterance section, whether a word or a word string included in a negative expression list is contained in the result of the voice recognition with respect to each of the utterance sections of the second conversation participant in the possible request section is decided, and negative utterance section is detected based on a decision result.

(Supplementary Notes 10)

The analysis object determination method according to Supplementary Notes 8 or 9, further including executing voice recognition with respect to a given utterance section contained in the voice data of the dissatisfaction conversation, wherein in detecting the request utterance section, the voice recognition result provided with respect to each of the utterance sections of the first conversation participant in the possible request section to a request utterance model subjected to machine learning is given, and the request utterance section is detected based on a request utterance score obtained from the request utterance model, and in detecting the negative utterance section, the voice recognition result provided with respect to each of the utterance sections of the second conversation participant in the possible negation section to a negative utterance model subjected to machine learning is given, and the negative utterance section is detected based on a negative utterance score obtained from the negative utterance model.

(Supplementary Notes 11)

A program that causes at least one computer to execute the analysis object determination method according to any one of Supplementary Notes 6 to 10.

(Supplementary Notes 12)

A computer readable storage medium storing the program according to Supplementary Notes 11.

This application is based upon and claims the benefit of priority from Japanese Patent Application No. 2013-163824 filed on Aug. 7, 2013, the entire disclosure of which is incorporated herein.

What is claimed is:

1. An analysis object determination device comprising:
a circuitry configured to:
detect, from data corresponding to voices in a dissatisfaction conversation, a request utterance section representing a request utterance of a first conversation participant of a plurality of conversation participants making the dissatisfaction conversation;
detect, from the data, a negative utterance section representing a negative utterance of a second conversation participant different from the first conversation participant, the negative utterance including a denial to the request utterance of the first conversation participant; and
determine a section in the data starting from a time point acquired from the request utterance section and ending at a time point acquired from the negative utterance section subsequent to the request utterance section, as an analysis section with respect to a cause of dissatisfaction of the first conversation participant of the dissatisfaction conversation; and
the circuitry configured to:
execute voice recognition with respect to a given utterance section contained in voice data of the dissatisfaction conversation;
give a voice recognition result provided with respect to each of a plurality of utterance sections of the first conversation participant in a possible request section to a request utterance model subjected to machine learning, and detect the request utterance section based on a request utterance score obtained from the request utterance model; and
give the voice recognition result provided with respect to each of a plurality of utterance sections of the second conversation participant in a possible negation section to a negative utterance model subjected to machine learning, and detect the negative utterance section based on a negative utterance score obtained from the negative utterance model.

2. The analysis object determination device according to claim 1,
wherein the circuitry is configured to determine as the analysis section, in the case where the circuitry has detected a plurality of request utterance sections and the circuitry has detected a plurality of negative utterance sections, the section between a start time of a first request utterance section and a finish time of the negative utterance section that has a latest finish time among the negative utterance sections having the start time and the finish time later than the start time of the first request utterance section, and having the start time earlier than the start time of a second request utterance section following the first request utterance section and temporally adjacent to the first request utterance section.

3. The analysis object determination device according to claim 1, further comprising the circuitry that is configured to detect an anger utterance section representing an anger emotion of the first conversation participant, from voice data of the dissatisfaction conversation,
   wherein the circuitry is configured to detect the request utterance section out of the plurality of utterance sections of the first conversation participant contained in the possible request section located in a predetermined temporal position in the dissatisfaction conversation, based on the detected anger utterance section, and
   the circuitry is configured to detect the negative utterance section out of the plurality of utterance sections of the second conversation participant contained in the possible negation section located in the predetermined temporal position in the dissatisfaction conversation, based on at least one of the detected anger utterance section and the detected request utterance section.

4. The analysis object determination device according to claim 3, further comprising the circuitry that is configured to execute voice recognition with respect to the given utterance section contained in the voice data of the dissatisfaction conversation,
   wherein the circuitry is configured to decide whether a word or a word string included in a request expression list is contained in the result of the voice recognition with respect to each of the plurality of utterance sections of the first conversation participant in the possible request section, and detects the request utterance section based on a decision result, and
   the circuitry is configured to decide whether a word or a word string included in a negative expression list is contained in the result of the voice recognition with respect to each of the plurality of utterance sections of the second conversation participant in the possible request section, and detects the negative utterance section based on the decision result.

5. The analysis object determination device according to claim 2, further comprising the circuitry that is configured to detect an anger utterance section representing an anger emotion of the first conversation participant, from voice data of the dissatisfaction conversation,
   wherein the circuitry is configured to detect the request utterance section out of the plurality of utterance sections of the first conversation participant contained in the possible request section located in a predetermined temporal position in the dissatisfaction conversation, based on the detected anger utterance section, and
   the circuitry is configured to detect the negative utterance section out of the plurality of utterance sections of the second conversation participant contained in the possible negation section located in the predetermined temporal position in the dissatisfaction conversation, based on at least one of the detected anger utterance section and the detected request utterance section.

6. An analysis object determination method performed by at least one computer, the method comprising:
   detecting, from data corresponding to voices in a dissatisfaction conversation, a request utterance section representing a request utterance of a first conversation participant of a plurality of conversation participants making the dissatisfaction conversation;
   detecting, from the data, a negative utterance section representing a negative utterance of a second conversation participant different from the first conversation participant, the negative utterance including a denial to the request utterance of the first conversation participant;
   determining a section in the data starting from a time point acquired from the request utterance section and ending at a time point acquired from the negative utterance section subsequent to the request utterance section, as an analysis section with respect to a cause of dissatisfaction of the first conversation participant of the dissatisfaction conversation;
   executing voice recognition with respect to a given utterance section contained in voice data of the dissatisfaction conversation;
   giving a voice recognition result provided with respect to each of a plurality of utterance sections of the first conversation participant in a possible request section to a request utterance model subjected to machine learning, and detecting the request utterance section based on a request utterance score obtained from the request utterance model; and
   giving the voice recognition result provided with respect to each of a plurality of utterance sections of the second conversation participant in a possible negation section to a negative utterance model subjected to machine learning, and detecting the negative utterance section based on a negative utterance score obtained from the negative utterance model.

7. A non-transitory computer-readable storage medium storing a program that causes at least one computer to execute the analysis object determination method according to claim 6.

* * * * *